United States Patent

[11] 3,600,630

[72] Inventor Grigory Strachanow
Des Plaines, Ill.
[21] Appl. No. 821,324
[22] Filed May 2, 1969
[45] Patented Aug. 17, 1971
[73] Assignee Warwick Electronics Inc.

[54] HORIZONTAL OUTPUT TUBE PROTECTION CIRCUIT
15 Claims, 2 Drawing Figs.

[52] U.S. Cl. 315/27 TD
[51] Int. Cl. H01j 29/76
[50] Field of Search 315/27

[56] References Cited
UNITED STATES PATENTS
3,419,751 12/1968 Hartz 315/27
3,427,496 2/1969 Wood 315/27

*Primary Examiner*—Rodney D. Bennett, Jr.
*Assistant Examiner*—Joseph G. Baxter
*Attorney*—Hofgren, Wegner, Allen, Stellman & McCord

ABSTRACT: The horizontal scan circuit for the cathode-ray tube of a television receiver having a horizontal power amplifier with a screen grid circuit including a transistor which is biased on by a signal from the horizontal scan circuit. If the input to the power amplifier fails, the bias signal is not present and the transistor turns off, limiting conduction by the power amplifier.

INVENTOR
Grigory Strachanow
BY Hofgren, Wegner, Allen, Stellman & McCord
ATTORNEYS

HORIZONTAL OUTPUT TUBE PROTECTION CIRCUIT

This invention relates to the horizontal scanning circuit in a television receiver and more particularly to a protection circuit for the horizontal output amplifier used in such scanning circuit.

In the horizontal scan circuit of a television receiver, a blocking oscillator operating at the line scan frequency of 15,750 Hz. drives a power amplifier to generate sawtooth scanning currents. The power amplifier has a negative bias on the control grid derived from the scanning signal, which limits the average current flow through the tube. In the event of a failure of the oscillator, the negative bias on the output tube is lost and the DC current through the tube may rise to more than twice its normal value. This will overheat the horizontal output tube and may damage other portions of the circuit.

The present invention protects the horizontal output tube by developing, from the output scanning signal of the horizontal output amplifier, a bias potential which is used to control the voltage of the screen grid of the output tube to allow substantial current flow through the tube only when a scanning signal is present.

One feature of the invention is the provision of a protective circuit for the scanning output amplifier including a circuit connecting a source of operating potential to the amplifier which includes a controllable, variable impedance device, a circuit for deriving a bias potential from the scanning signal in the output of the amplifier and a means for applying this bias potential to the variable impedance device, to apply full operating potential to the amplifier in the presence of a scanning signal and to reduce the operating potential in the absence of a scanning signal.

Another feature is that the output amplifier is a tube having multiple control grids, with the source of scan drive signal connected to one and the operating potential being applied by the protective circuit to another.

A further feature is that the variable impedance device is a transistor connected in series between the source of operating potential and the amplifier, and having a low impedance in the presence of a scanning signal and a high impedance in the absence thereof. More particularly, the emitter-collector circuit of the transistor is connected in series between the source and the amplifier and has a resistor connected in parallel with the emitter-collector circuit. The resistor has a resistance several times greater than the low impedance of the transistor but less than the high impedance thereof, to cause the tube to conduct slightly when the transistor has a high impedance.

And another feature is that the output circuit of the amplifier includes means for developing a supplementary operating potential from the scanning signal, and the bias potential is derived from the supplimentary operating potential.

Further features and advantages of the invention will readily be apparent from the following specification and from the drawings, in which.

Figure 1:
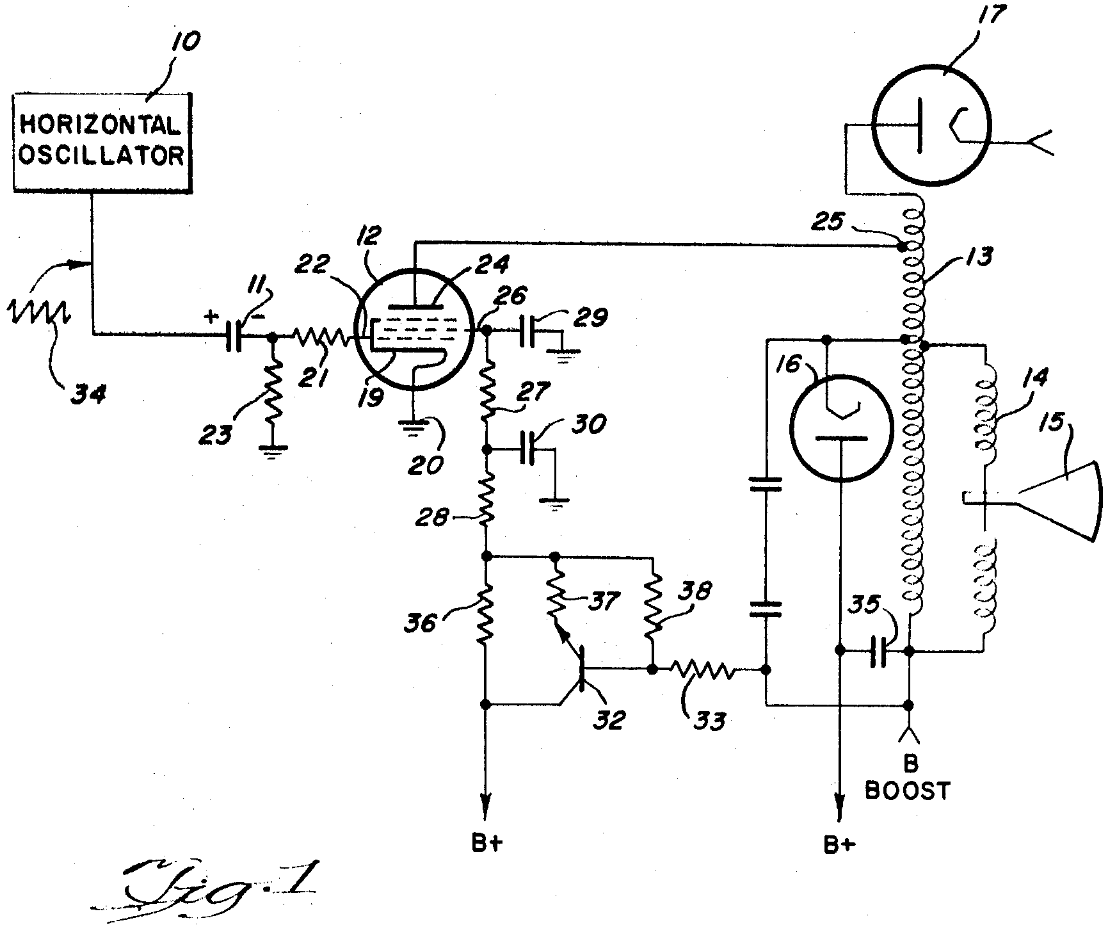
FIG. 1, is a schematic diagram illustrating an embodiment of the invention.

The invention is disclosed and described as incorporated in the horizontal scan circuit of a television receiver; and is particularly adapted for use in this circuit. It can be used, however, in the scanning circuits of other systems where the scan power amplifier requires a scanning drive signal to limit the current therethrough.

In the drawings, only so much of the circuitry is shown and described as is necessary for understanding of the invention. The other components of a television system are well known.

In FIG. 1, the invention is illustrated in a widely used deflection system in which the output amplifier is designed for class C operation, drawing grid current on each cycle of operation, to establish a grid-leak bias voltage. The output of horizontal oscillator 10 (which may be synchronized with horizontal synchronizing information in the received television signal) is connected through capacitor 11 with horizontal amplifier 12. The output of the amplifier is connected with an autotransformer 13 to which are connected the scanning coils 14 associated with cathode-ray tube 15, a damper diode 16 and a high voltage rectifier 17.

Amplifier 12 is a pentode having its cathode 19 returned to ground 20. The horizontal scanning drive signal from oscillator 10 is connected through a current limiting resistor 21 with control grid 22. The control grid circuit is returned to ground through resistor 23. Plate 24 provides the output of the amplifier and is connected with a tap 25 on autotransformer 13.

The protective circuit of this invention is provided in the circuit of screen grid 26. The screen grid is provided with a decoupling network including series resistors 27, 28 and shunt capacitors 29, 30, connected to ground. The principal active component of the protective circuit is a transistor 32 which has an emitter-collector circuit connected in series with resistors 27, 28 and a source of positive operating potential, B+. The base of transistor 32 is connected through resistor 33 with a source of bias potential in the scanning circuit. When a scanning signal is present in the output circuit of the amplifier, the impedance of transistor 32 is low and the appropriate operating potential is applied to screen grid 26. If a scanning signal is not present in the output circuit, the bias on transistor 32 is removed, it ceases to conduct and the voltage of the screen grid drops. This limits the current through amplifier 12.

Considering now the operation of the circuit in more detail, the output of the horizontal oscillator 10 has the general form illustrated by the curve 34. With the positive peaks of this driving signal, control grid 22 goes positive and grid current is drawn. The amplitude of the current is limited by resistor 21. The grid current charges capacitor 11 with the polarity indicated, maintaining a normal negative potential on the control grid and limiting the average flow of current through tube 12. However, if the horizontal oscillator 10 fails the charge on capacitor 11 is dissipated through resistor 23 and the control grid voltage approaches zero. This results in an excessive current flow through the tube.

In the output circuit of horizontal amplifier 12, damper 16 conducts during the retrace portion of the scanning cycle to dissipate the current in deflection coils 14, readying the circuit for the next scanning line. A boosted B+ potential is developed across capacitor 35, from the energy of the scanning current. This potential is utilized to control conduction of transistor 32. When the scanning signal appears in the output circuit, transistor 32 conducts. If there is no scanning signal, the boosted B+ potential is not present and transistor 32 is cut off.

Connected in parallel with the emitter-collector circuit of transistor 32 is a resistor 36 which has a value that is large with respect to the impedance of transistor 32 when it conducts, but small in relation to the transistor impedance when it is nonconductive. A suitable value for resistor 36 is of the order of 22,000 ohms. A small voltage is applied to the screen grid through resistor 36 even though the transistor is cut off. This enables the amplifier to pass a scan signal when the circuit is first energized, allowing the transistor bias potential to develop.

Resistor 37, connected with the emitter of transistor 32 and resistor 38, connected from the base to resistor 28 complete the bias network for the transistor.

Figure 2:
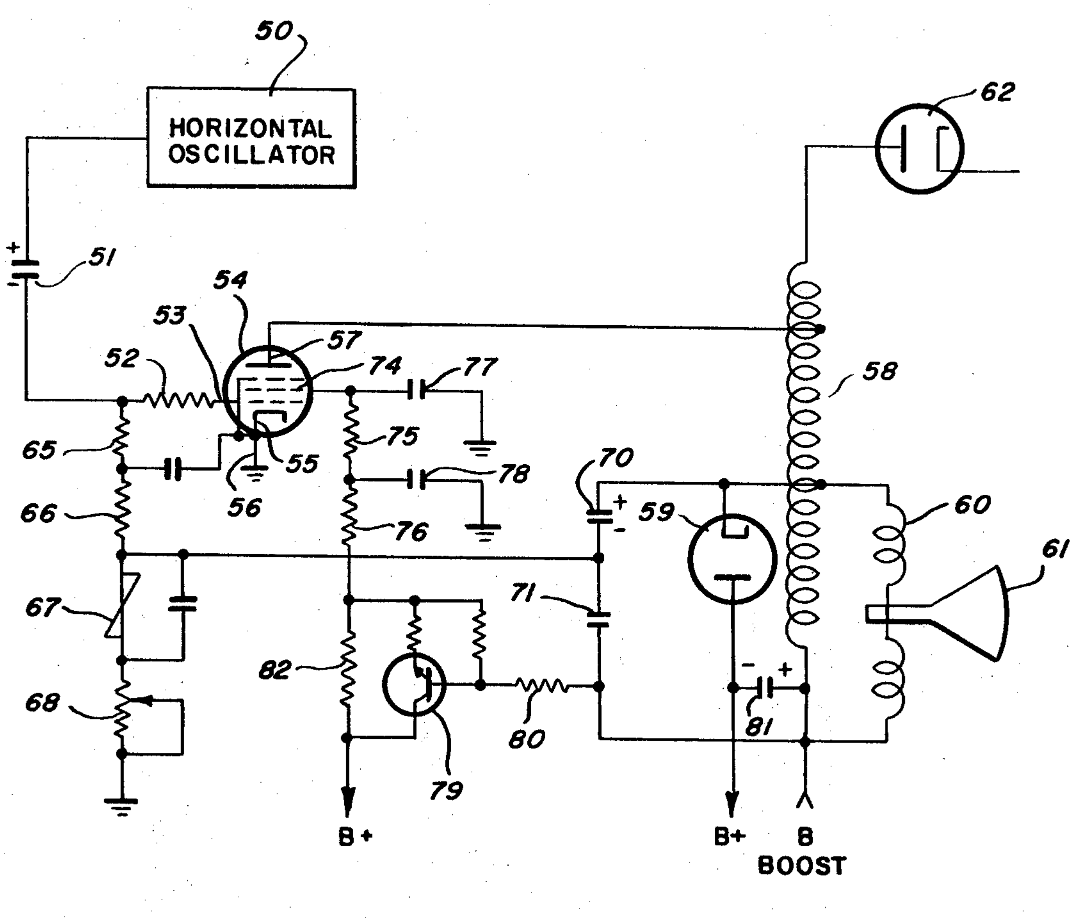
FIG. 2 is a schematic drawing illustrating another embodiment of the invention.

In FIG. 2 the invention is incorporated in a horizontal scan circuit in which the bias for the control grid of the amplifier is derived from the output circuit.

Horizontal oscillator 50 is connected through capacitor 51 and series resistor 52 with the control grid 53 of amplifier 54. Cathode 55 is returned to ground 56 while plate 57 is connected with output autotransformer 58.

The plate circuit of the amplifier is completed through damper diode 59 to a source of operating potential B+ Deflection coils 60, associated with display tube 61, are connected across a portion of transformer 58. High voltage rectifier 62 is connected across the entire transformer winding and provides high voltage for the display tube.

Amplifier control grid 53 is returned to ground 56 through a resistive network connected to the junction between coupling capacitor 51 and series resistor 52. This network includes resistors 65 and 66, a voltage dependent resistor (VDR) 67 and potentiometer 68.

The upper end of voltage dependent resistor 6 (the junction with resistor 66) is connected with the junction between capacitors 70 and 71, connected in series across a portion of output transformer 58. The negative pulse appearing at the cathode of damper 59 is coupled through capacitor 70 to VDR 67. This resistor functions as a rectifier and capacitor 70 is charged with the polarity indicated. The negative voltage on capacitor 70 is coupled through resistors 66, 65 and 52 to the control grid 53 of amplifier 54 limiting the average current through the amplifier. The amplitude of the pulse at the cathode of damper 59 is subject to variation with changes in current drawn from high voltage rectifier 62. The circuit described provides a degree of compensation for these variations and tends to stabilize the high voltage. The level of the high voltage may be varied by potentiometer 68.

The circuit for the screen grid 74 of amplifier 54 is the same as that for the circuit of FIG. 1. The screen grid is decoupled by a pair of series resistors 75, 76 and shunt capacitors 77, 78. Connected in series with resistor 75 and 76 is the emitter-collector circuit of transistor 79, in turn connected with B+. The base of transistor 79 is connected through isolating resistor 80 to the boosted B+ source voltage developed across capacitor 81, which is connected between the plate of damper 59 and the output transformer 58.

In the presence of scanning signals from the oscillator, the boosted B+ bias potential turns transistor 79 on and it has a low impedance. In this condition the appropriate operating potential is applied to screen grid 74 from the B+ supply. At the same time, the bias potential on capacitor 70, developed from the scanning signal, limits the current to amplifier 54 to a reasonable level.

Should the scanning signal be lost, the voltage on control grid 53 of amplifier 54 will rise toward zero, a high current condition. At the same time, the bias for transistor 79 is lost and the transistor appears as a high impedance in series with the screen grid. Accordingly, current through amplifier 54 is limited to protect the tube.

A resistor 82, connected in parallel with transistor 79, applies a low operating potential to the screen grid 74 to enable the circuit to start operation.

I claim:

1. In a cathode-ray tube scanning system having a source of scan drive signal, an amplifier having an input coupled to said source of scan drive signal and an output, and an output circuit coupled to the output of said amplifier for applying a scanning signal to said cathode-ray tube, the improvement comprising a protective circuit for said amplifier comprising a source of operating potential;

variable impedance means connected in series between said source of operating potential and said amplifier, means for deriving a bias potential from the scanning signal in said output circuit; and means for applying said bias potential to said variable impedance device to cause said variable impedance device to have a low impedance in the presence of a scanning signal in said output circuit to thereby couple substantially full operating potential to said amplifier and the have a high impedance in the absence of the scanning signal in said output circuit to thereby couple a reduced portion of said operating potential to said amplifier to reduce conduction therein.

2. The protective circuit of claim 1 wherein said amplifier includes a control element to which the operating potential is applied by said circuit.

3. The protective circuit of claim 2 wherein said amplifier is a tube with multiple control grids, said source of scan drive signal being connected to one of said grids and said operating potential being applied by said variable impedance to another of said grids.

4. The protective circuit of claim 1 wherein the variable impedance device includes switch means controllable by the bias potential derived from said output circuit.

5. The protective circuit of claim 1 wherein said variable impedance device includes a switch means in shunt with a resistor, said switch means being conductive in the presence of said bias potential and nonconductive in the absence of said bias potential.

6. The protective circuit of claim 1 wherein said variable impedance device is a transistor connected in series between said source of operating potential and said amplifier, said transistor having a low impedance in the presence of a scanning signal and a high impedance in the absence thereof.

7. The protective circuit of claim 6 in which the transistor has an emitter-collector circuit connected in series between the source of operating potential and the amplifier and a base element connected with said bias deriving means.

8. The protective circuit of claim 7 wherein said amplifier is a tube with multiple control grids, said source of scan drive signal being connected to one of said grids and said operating potential being applied by said circuit to another of said grids.

9. The protective circuit of claim 8 wherein a resistor is connected in parallel with the emitter-collector circuit of said transistor, said resistor having a resistance which is several times greater than the low impedance of the transistor, but less than the high impedance thereof.

10. The protective circuit of claim 9 in which a second resistor is connected in series with said transistor between said source of operating potential and said control grid.

11. The protective circuit of claim 1 wherein said output circuit includes means for developing a supplementary operating potential from said scanning signal, and said bias potential is derived from said supplementary operating potential.

12. The protective circuit of claim 11 in which said output circuit includes scanning coils for said cathode ray tube, a damper for dissipating the energy in the scanning coil at the end of the scan, and a capacitor charged by said damper, and wherein said bias potential is derived from said capacitor.

13. The protective circuit of claim 1 in which said amplifier has a current control element and including means for developing from the scanning signal a bias for said element which limits the current of said amplifier to a desired level.

14. The protective circuit of claim 13 in which said amplifier is a tube and said current control element is a control grid with a grid current bias network connected thereto.

15. The protective circuit of claim 13 in which said amplifier is a tube and said control element is a control grid, and including means for deriving a scanning signal from the amplifier output and for rectifying said signal to establish a bias for said control grid.